US012606366B2

(12) United States Patent
Harrienger

(10) Patent No.: US 12,606,366 B2
(45) Date of Patent: Apr. 21, 2026

(54) ELECTRICAL INTERCONNECT FOR INTERMODAL SHIPPING CONTAINERS

(71) Applicant: Dwight A. Harrienger, Webster, NY (US)

(72) Inventor: Dwight A. Harrienger, Webster, NY (US)

( * ) Notice: Subject to any disclaimer, the term of this patent is extended or adjusted under 35 U.S.C. 154(b) by 411 days.

(21) Appl. No.: 18/202,593

(22) Filed: May 26, 2023

(65) Prior Publication Data

US 2023/0382635 A1 Nov. 30, 2023

Related U.S. Application Data

(60) Provisional application No. 63/347,275, filed on May 31, 2022.

(51) Int. Cl.
| | |
|---|---|
| *H02G 3/22* | (2006.01) |
| *B65D 88/12* | (2006.01) |
| *B65D 90/00* | (2006.01) |
| *H02S 10/40* | (2014.01) |
| *H02S 40/36* | (2014.01) |

(52) U.S. Cl.
CPC .......... B65D 90/00 (2013.01); B65D 88/121 (2013.01); H02G 3/22 (2013.01); *B65D 2590/0083* (2013.01); *H02S 10/40* (2014.12); *H02S 40/36* (2014.12)

(58) Field of Classification Search
None
See application file for complete search history.

(56) References Cited

U.S. PATENT DOCUMENTS

| | | |
|---|---|---|
| 8,539,724 B2 | 9/2013 | Bullivant et al. |
| 9,157,418 B2 | 10/2015 | Petersen et al. |
| 9,545,852 B2 | 1/2017 | Streett |
| 10,203,134 B2 | 2/2019 | Johnson et al. |
| 11,108,354 B2 | 8/2021 | Carrington |
| 2015/0162865 A1* | 6/2015 | Cowham ................ H02S 30/20 |
| | | 136/251 |

(Continued)

FOREIGN PATENT DOCUMENTS

| | | |
|---|---|---|
| DE | 202019003680 U1 | 10/2019 |
| GB | 2463098 A | 3/2010 |

(Continued)

OTHER PUBLICATIONS

Military Solar Powered Shipping Container, pp. 1-5; OkSolar.com (date accessed May 5, 2025).

(Continued)

*Primary Examiner* — Krystal Robinson
(74) *Attorney, Agent, or Firm* — Harter Secrest & Emery LLP; Douglas R. Smith

(57) ABSTRACT

An electrical interconnect provides electrical communication between adjacent intermodal shipping containers. The electrical interconnect includes a carriage moveable between a retracted position and an extended position relative to the intermodal shipping container, wherein the carriage includes an electrical contact and a magnet configured to operably engage a corresponding electrical contact and a magnet on a second intermodal shipping container. The carriage is mounted to the intermodal shipping container through a pair of guide rods and bias members.

14 Claims, 7 Drawing Sheets

CONNECTIONS BETWEEN
SHIPPING CONTAINERS
(SHOWN IN CONNECTED POSITION)

(56)                References Cited

U.S. PATENT DOCUMENTS

| | | |
|---|---|---|
| 2018/0069416 A1 | 3/2018 | Brace et al. |
| 2019/0305720 A1 | 10/2019 | Rogalka |
| 2020/0280280 A1 | 9/2020 | Schelhaas et al. |
| 2021/0058024 A1* | 2/2021 | Luis y Prado .......... H02S 20/00 |
| 2022/0069766 A1 | 3/2022 | Mullings |
| 2022/0119210 A1* | 4/2022 | Felton .................... G06Q 50/10 |
| 2023/0081734 A1 | 3/2023 | Prentice et al. |

FOREIGN PATENT DOCUMENTS

| | | |
|---|---|---|
| KR | 102392162 B1 | 4/2022 |
| WO | 2019209097 A1 | 10/2019 |
| WO | 2021070146 A1 | 4/2021 |

OTHER PUBLICATIONS

Shipping Container Sales, Rentals & Mods, p. 1; Conexwest.com
(date accessed May 5, 2025).

* cited by examiner

TYPICAL EXISITNG
VENTS TO REMAIN

30

40

43

STAINLESS
STEEL ANCHOR
BOLTS

24

12

12

PHOTOVOLTAIC
PANELS ATTACHED
TO THE EXTERIOR
OF SHIPPING CONTAINERS

METAL ENCLOSURE TO PROTECT WIRES

METAL ENCLOSURE TO PROTECT CONNECTION MECHANISM

ELECTRICAL INTERCONNECT FOR INTERMODAL SHIPPING CONTAINERS

CROSS-REFERENCE TO RELATED APPLICATIONS

The present application claims the benefit of US Provisional patent application entitled Solar Shipping Containers and Truck Boxes, U.S. application No. 63/347,275, filed May 31, 2022, the entirety of which is hereby incorporated by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND

Field of the Invention

The present disclosure relates to the electrical interconnection of shipping containers, and particularly to the electrical interconnection of mechanically interconnected shipping containers, and more particularly the automatic electrical interconnection of mechanically interconnected shipping containers.

Description of Related Art

An intermodal shipping container is a standardized shipping container designed to be easily transferred between different modes of transportation, such as ships, trains, and trucks. The first intermodal shipping containers were developed in the early 20th century, but it wasn't until the 1950s that the containers were used on an economic scale.

The use of intermodal shipping containers quickly spread, and by the 1970s intermodal shipping containers had become the standard way to ship goods around the world. Intermodal shipping containers have a number of advantages over traditional methods of shipping, including: efficiency as the containers can be loaded and unloaded quickly and, in a standard, repeatable manner; safety, as the goods within the containers are less likely to be damaged in transit; and security, as the containers can be locked and sealed.

Today, intermodal shipping containers are used to transport a wide variety of goods, including food, clothing, furniture, and electronics. The intermodal shipping containers have become an essential part of the global economy, and have helped to make international trade more efficient, safer, and more environmentally friendly.

There is a need to employ the exposed surfaces and the often mechanically interconnected status of the intermodal shipping containers.

BRIEF SUMMARY OF THE INVENTION

Generally, the present disclosure provides for the electrical interconnection of shipping containers, wherein the containers can include at least one of a solar panel and a rechargeable battery.

The present disclosure provides an electrical interconnect for an intermodal shipping container, the intermodal shipping container including a bottom side rail and a top side rail, the electrical interconnect including a first carriage mounted to the bottom side rail, the first carriage movable between an extended position and a retracted position; a first electrical contact connected to the first carriage for movement with the first carriage; a first magnet connected to the first carriage for movement with the first carriage; and a first bias member intermediate the first carriage and the bottom side rail, the first bias member urging the first carriage to the retracted position.

In a further configuration, the present disclosure provides an intermodal shipping container having a first bottom side rail and a second bottom side rail, the first bottom side rail and the second bottom side rail extending parallel to a longitudinal axis of the intermodal shipping container; a first top side rail and a second top side rail, the first top side rail and the second top side rail extending parallel to the longitudinal axis of the intermodal shipping container; a first carriage moveably mounted to at least one of the first bottom side rail and the second bottom side rail, the first carriage including a first electrical contact, a second electrical contact, and a first magnet; a first bias member intermediate the first carriage and the at least one of the first bottom side rail and the second bottom side rail; a second carriage moveably mounted to at least one of the first top side rail and the second top side rail, the second carriage including a third electrical contact, a fourth electrical contact, and a second magnet; and a second bias member intermediate the second carriage and the at least one of the first top side rail and the second top side rail.

BRIEF DESCRIPTION OF THE SEVERAL VIEWS OF THE DRAWING(S)

DETAILED DESCRIPTION OF THE INVENTION

Figure 1:
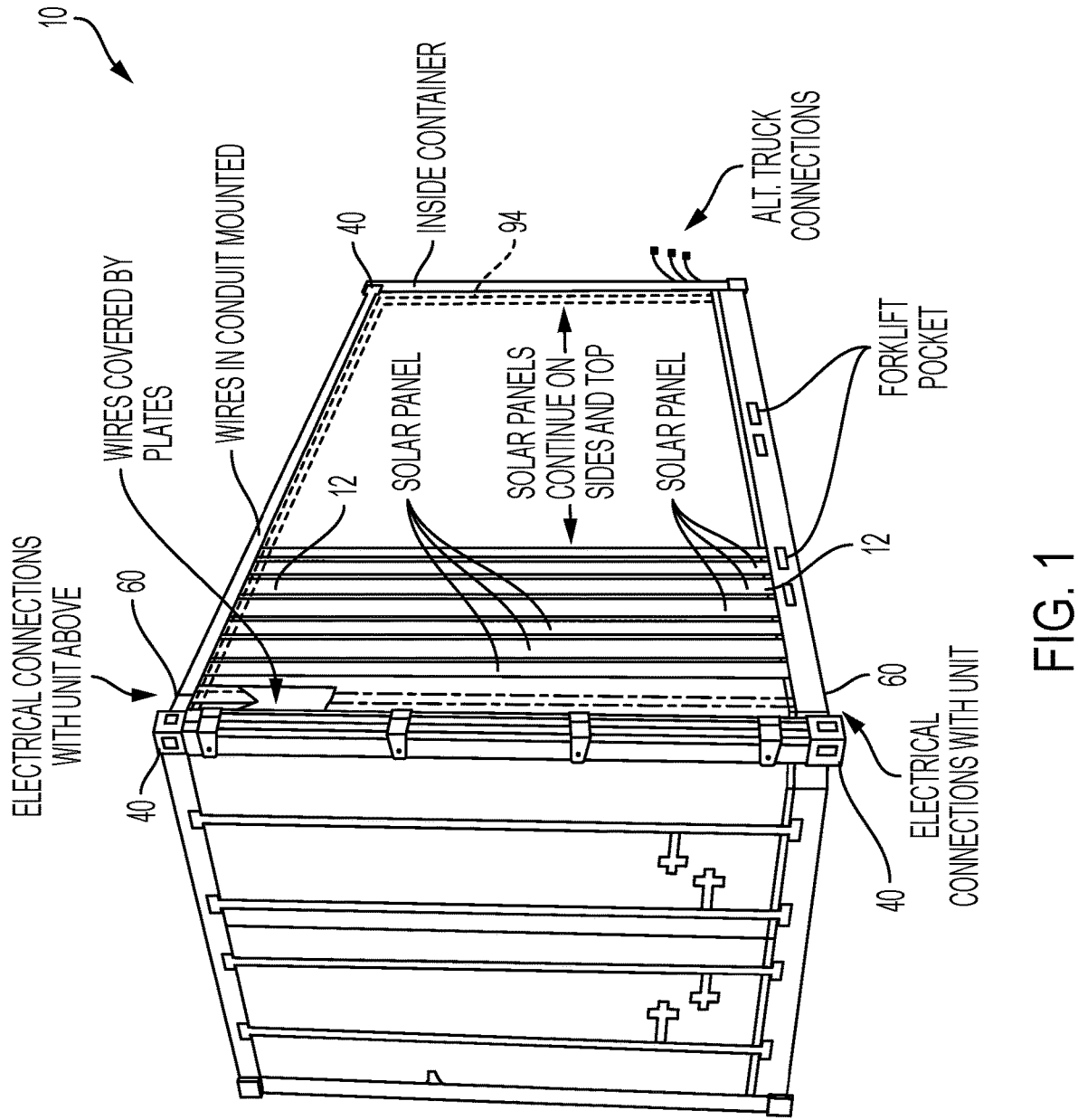
FIG. 1 is a perspective schematic of a representative intermodal shipping container.

The present system is configured to provide electrical interconnection between intermodal shipping containers 10, wherein the electricity may be supplied from a source on the shipping container, such as a solar panel 12 or carried by the intermodal shipping container, such as but not limited to a battery 14, including but not limited to a rechargeable battery.

The intermodal shipping container 10, sometimes referred to as a shipping container, intermodal container, container, cargo or freight container, shipping, sea or ocean container, container van or sea van, sea can or C can, or MILVAN, SEAVAN, or RO/RO, is a standardized container designed and built for intermodal freight transport, in that the container can be used across different modes of transport—from ship to rail to truck—without unloading and reloading cargo from the container.

While intermodal shipping containers 10 are primarily used to store and transport materials and products efficiently and securely in the global containerized intermodal freight transport system, smaller numbers of the intermodal shipping containers are also used in regional transport systems as well.

Based on size alone, up to 95% of the intermodal shipping containers in use comply with ISO standards, and can designated ISO containers.

The ISO intermodal shipping container 10 includes a frame 20 formed of left and right bottom side rails 22, left and right top side rails 24, four corner posts 26, front and back bottom end rails 28 (including at least one door sill), and front and back top end rails 30 (including at least one door header).

Figure 4:
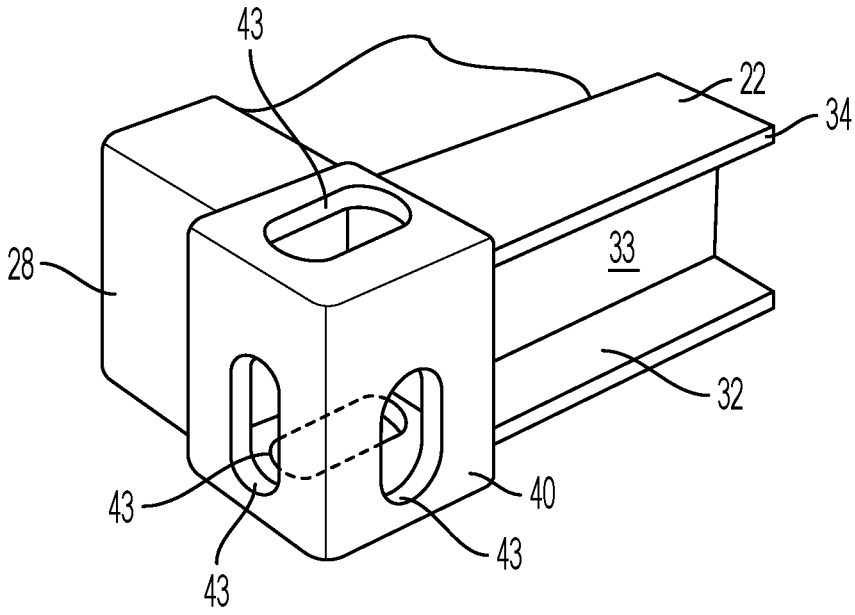
FIG. 4 is a perspective view of a corner casting on the intermodal shipping container.
Figure 5:
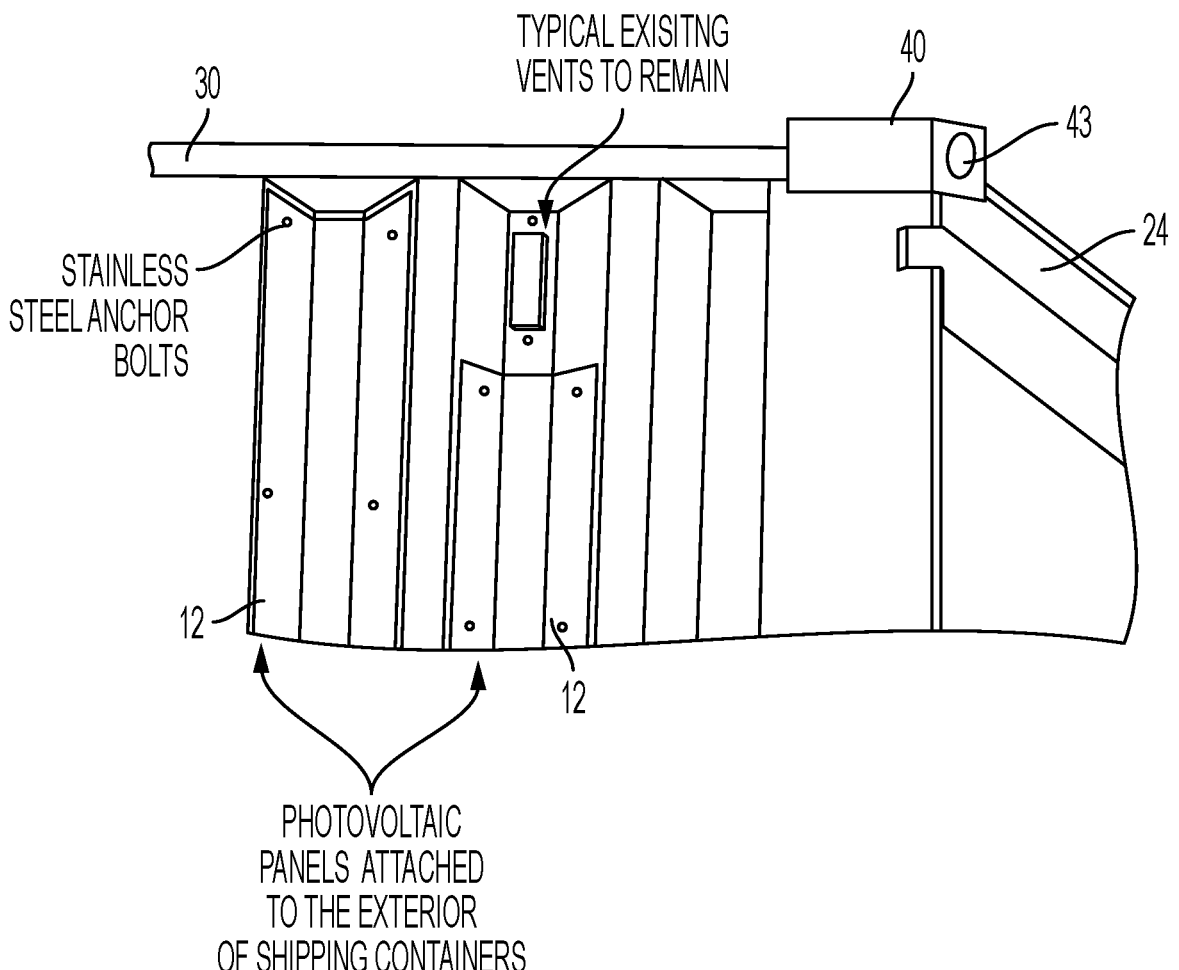
FIG. 5 is a perspective view of portion of the intermodal shipping container showing a solar panel.
Figure 6:
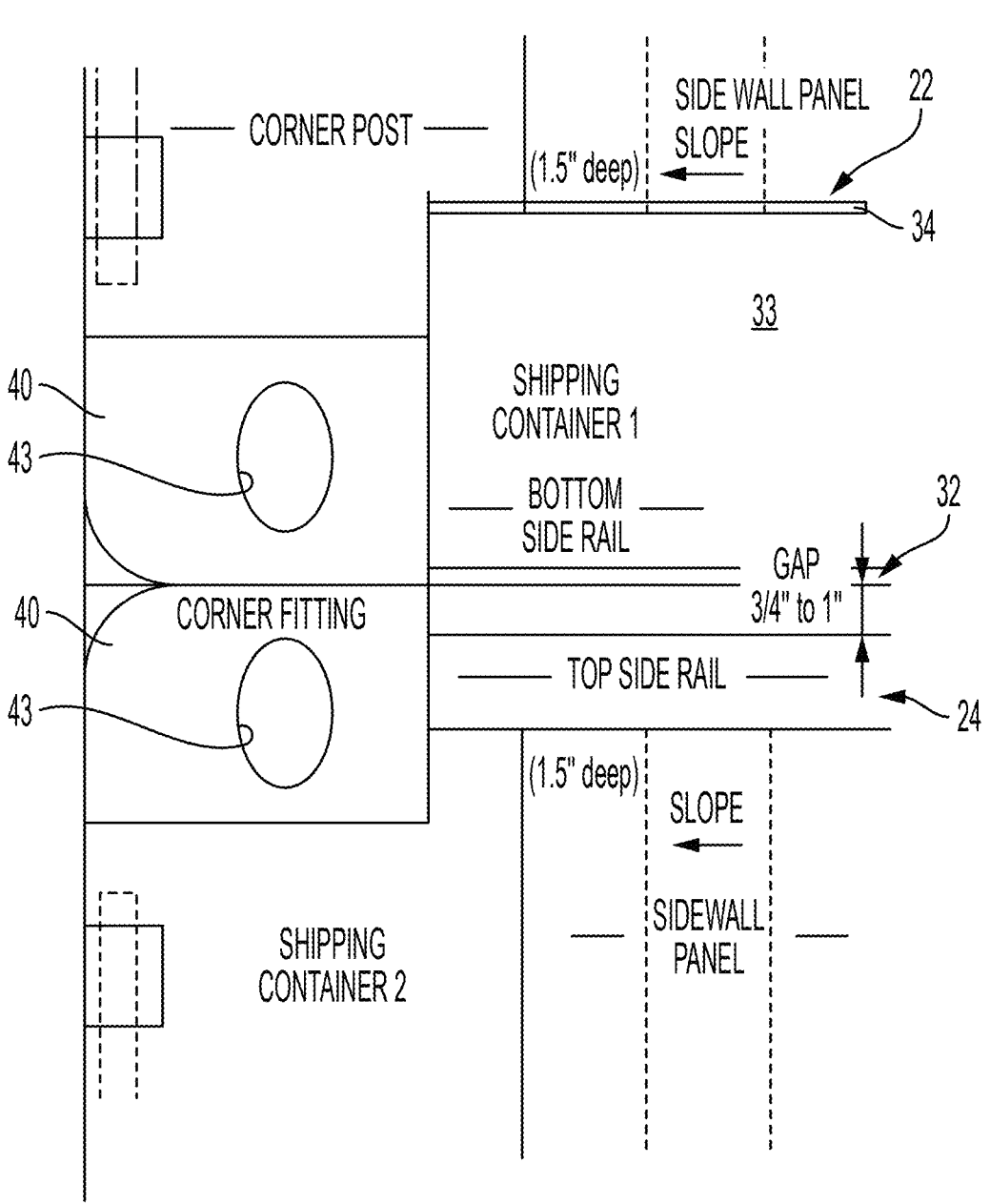
FIG. 6 is a side elevational view of a portion of a pair of stacked intermodal shipping containers.
Figure 7:
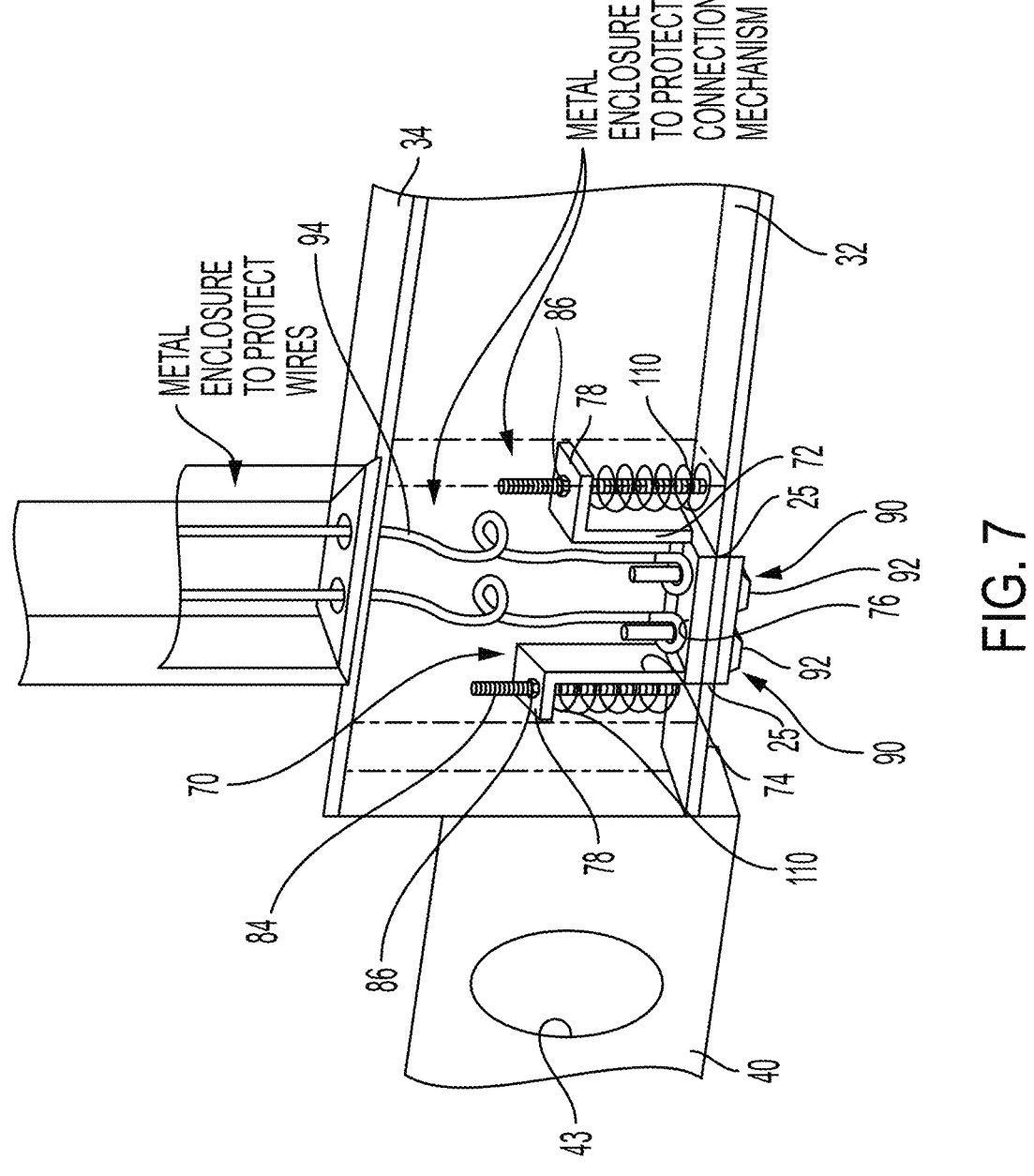
FIG. 7 is a perspective view of a first configuration of an electrical interconnect on the intermodal shipping container.
Figure 8:
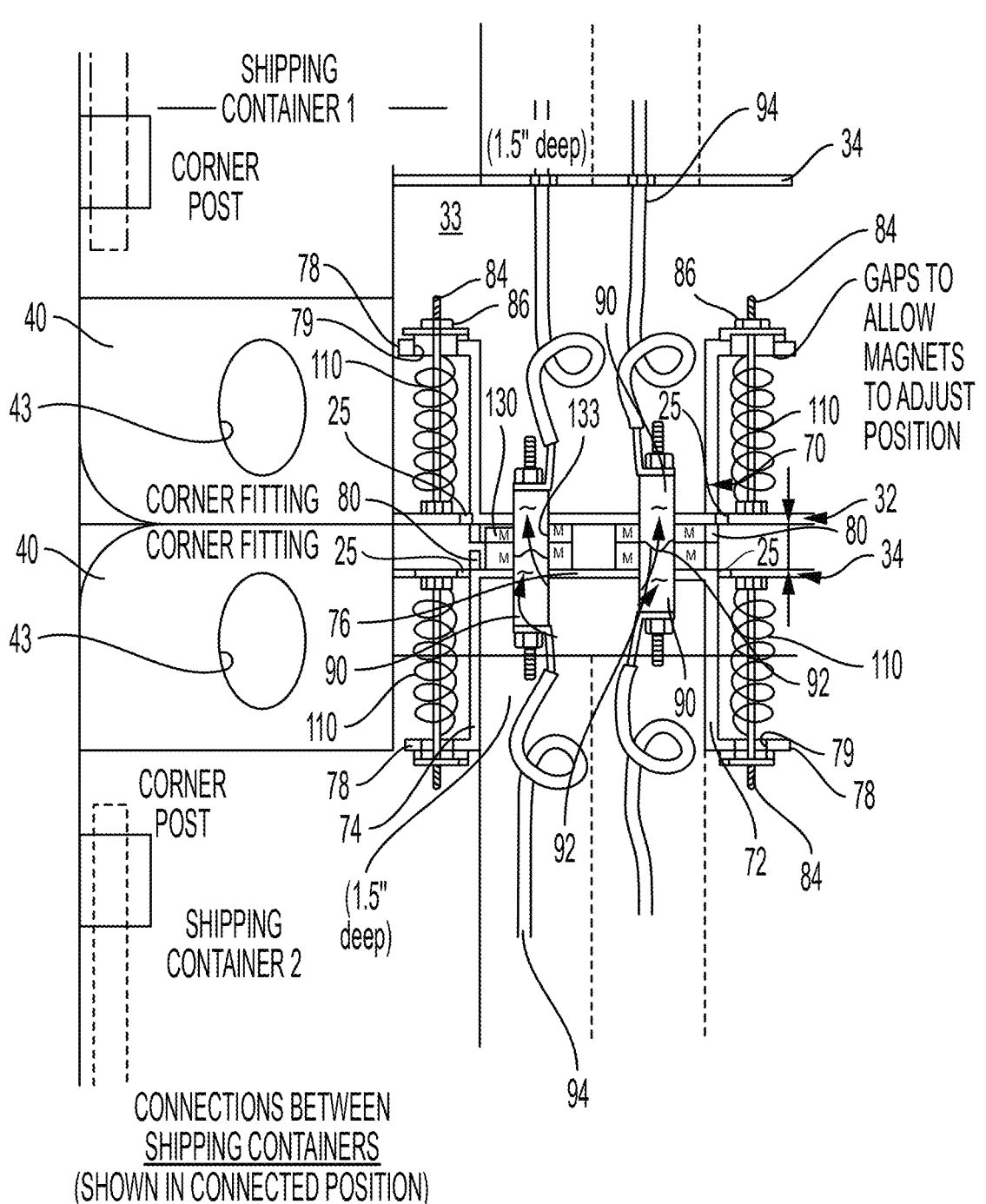
FIG. 8 is side elevational view of a second configuration of an electrical interconnect on the intermodal shipping container.

In one configuration, as seen in FIGS. 4, 7, and 8, at least each of the bottom side rails 22 and the top side rails 24 includes a lower flange 32 and a spaced apart upper flange 34, wherein the flanges define a recess 33 extending along a longitudinal dimension of the side rail. The recess 33 has a vertical dimension defined by the vertical spacing of the lower flange 32 and the upper flange 34 and a horizontal dimension defined by the horizontal dimension of the upper flange and the lower flange.

Figure 2:
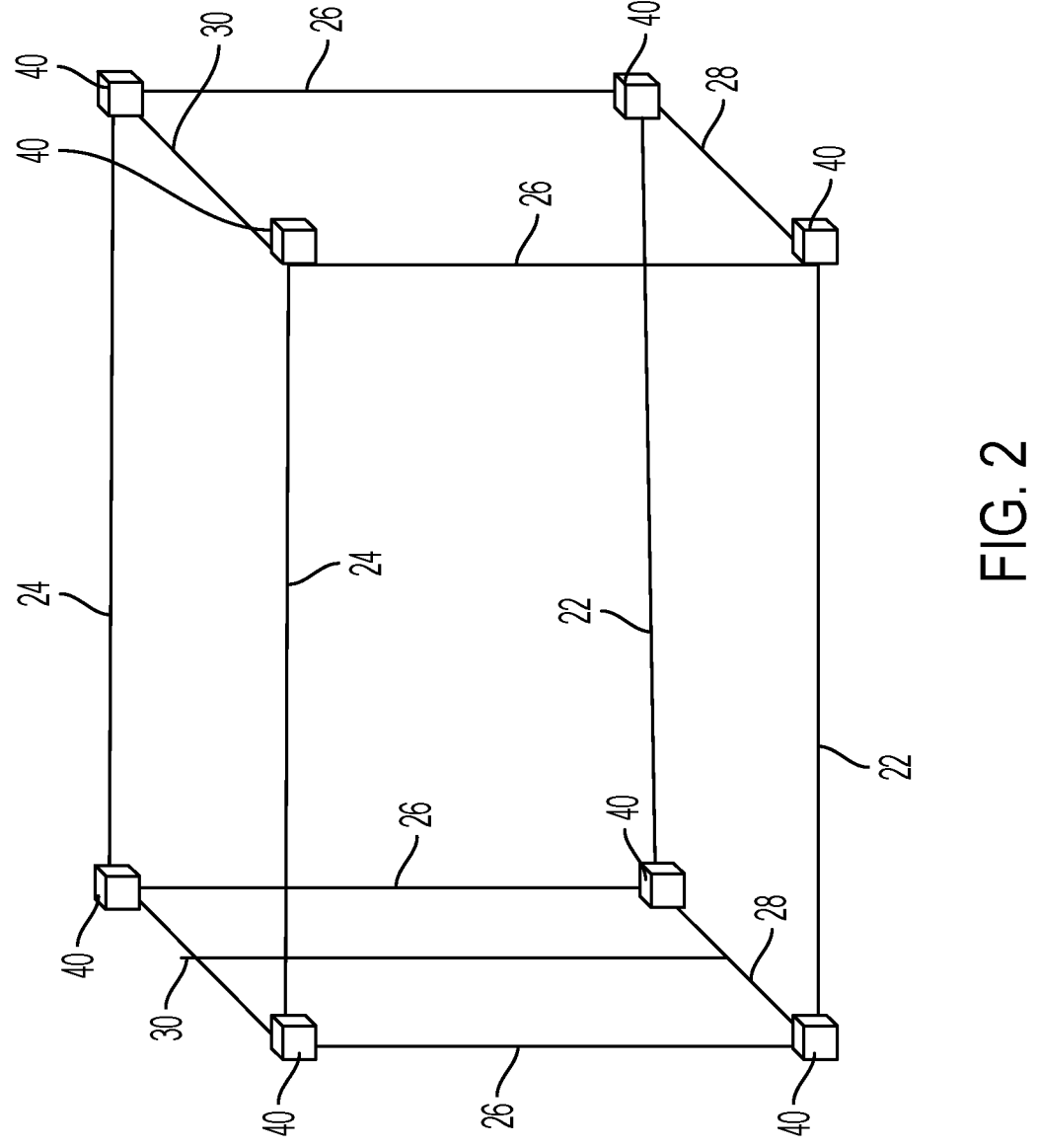
FIG. 2 is a schematic of a frame of a representative intermodal shipping container.
Figure 3:
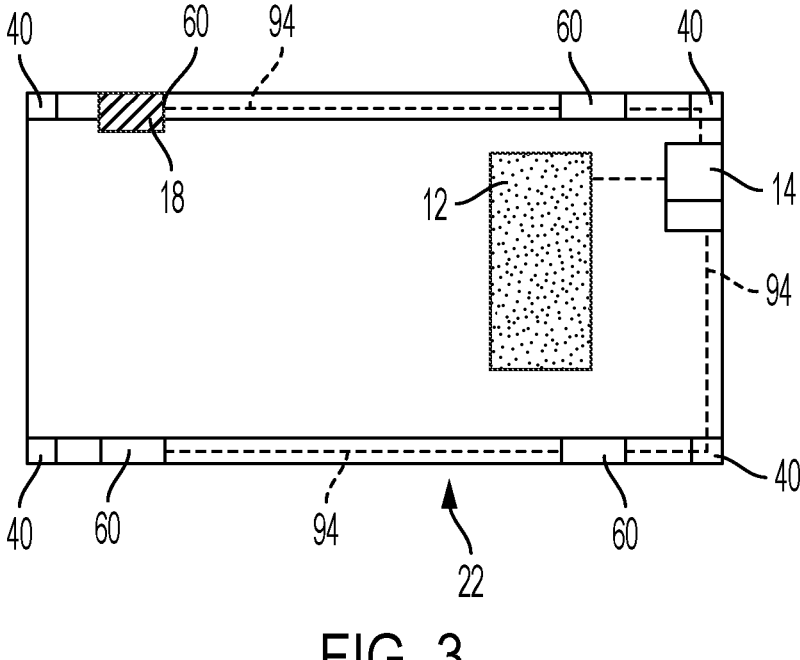
FIG. 3 is schematic of an intermodal shipping container having a solar panel and an electrical interconnect.

Thus, as seen in FIG. 2, there are eight vertices of the side rails 22, 24, corner posts 26, and end rails 28, 30, wherein each of the eight vertices includes a corner casting 40. Each corner casting 40 is a metal bracket welded to the frame 20. Referring to FIGS. 1 and 4, the corner casting 40 includes a hole 43 in a vertical plane and a hole in a horizontal plane. As set forth below, the holes 43 are configured to facilitate an interconnection to a second intermodal shipping container and/10 or facilitate releasable engagement with a transport device, such as a crane (not shown).

The intermodal shipping container 10 includes a floor of wood or steel, wherein the floor is configured to support the weight of the cargo within the container. Sidewalls 36 and end walls 38 are made of steel or aluminum and project from the respective bottom side rails. A roof is connected to the top side rails 24 and top end rails 30, and is also typically formed of steel or aluminum.

The intermodal shipping container 10 includes a door 35 located on one end of the container. The door 35 is typically made of steel and has a locking mechanism that prevents unintended opening of the door and can include an interface for a security lock. Optionally, the intermodal shipping container 10 can include a gasket to form an interface between the door 35 and the respective corner posts 26 and end rails 28, 30. Further, configurations of the intermodal shipping container 10 can include vents in the roof and/or sidewalls of the container. The vents are configured to allow air to circulate inside the intermodal shipping container and help to moderate temperature within the container.

The intermodal shipping containers 10 are typically made of steel and are 20 or 40 feet long, 8 feet wide, and 8.5 feet high, wherein the door is located at one end such that the containers can be stacked on top of each other.

The intermodal shipping containers 10 are selectively mechanically interconnected during various stages of transport, and particularly on ships and railroads, where the containers are stacked. Intermodal shipping containers 10 are mechanically interconnected using a variety of systems. It is understood that the term mechanically connected includes a connection by temporary fasteners or couplers such as when the intermodal shipping containers 10 are interconnected for transportation or connected to a transport vehicle.

For example, twistlocks (not shown) are a common mechanism for mechanically connecting intermodal shipping containers 10. Generally, the twistlocks are metal pins having a square or rectangular head that fits into holes in the corner castings 40 of two adjacent intermodal shipping containers 10. When the twistlocks are rotated, the intermodal shipping containers 10 are locked together by reorienting a head of the lock within the respective corner casting 40 to preclude separation of the corner casting (and hence container) from the twistlock. When the twistlock is turned, the head precludes passage from the corner casting 40 and thus locks, mechanically connects, the two intermodal shipping containers 10 together.

Conversely, to disconnect the intermodal shipping containers 10, the twistlock is rotated in a counterclockwise direction until the head of the twistlock can pass through the aperture 43 in the corner casting 40 and the associated intermodal shipping container is released.

Another system for the mechanical connection of the intermodal shipping containers 10 also employs the corner castings, wherein chains can be passed through the adjacent corner castings 40 to retain the containers relative to each other.

In addition to being connected to each other, the intermodal shipping containers 10 are also secured, mechanically connected, to the associated transport vehicle, such as a ship, a train, or a truck. This mechanical connection can be achieved through a variety of methods, such as lashing rods, turnbuckles, and chains. Lashing rods are metal rods that are threaded through holes in the corner castings and then tightened using turnbuckles. Chains are also used to secure the intermodal shipping containers 10 to the transport vehicle, such as the ship. The methods used to connect and secure intermodal shipping containers 10 on a ship can vary depending on the size and type of ship, the number of containers being transported, and the weather conditions.

As seen in FIG. 4, the intermodal shipping containers 10 can include a plurality of recessed areas on the external surface of the intermodal shipping container. These recessed areas may be bounded or defined by adjacent shoulders of the walls or corner castings, wherein the shoulders (or raised areas) are configured to interface with, connect or contact adjacent intermodal shipping containers.

The system contemplates attaching photovoltaic panels 12 on at least a portion of, and in some configurations a majority of the exterior surfaces of the intermodal shipping container, except the weight bearing surfaces, such as the bottom (and the top in those having a stackable configuration). The photovoltaic panels 12 could be mounted in the grooves along the walls, such as the sides of the containers for impact protection. The associated angled or including surfaces of the intermodal shipping container 10 adjacent the photovoltaic panels could also help capture sunlight at increased angles of incidence.

As set forth below, the present system contemplates electrical interconnects 60 that connect the photovoltaic panels 12 of one intermodal shipping container 10 with the photovoltaic panels or storage device of a second intermodal shipping container when the intermodal shipping containers are mechanically connected, such as stacked, when the intermodal shipping containers are on wharf areas, for rail transportation, or on cargo ships. During times when the intermodal shipping containers 10 are in transit, the surfaces of the intermodal shipping container are exposed to sunlight and the solar energy is collected as electrical power by the photovoltaic panels 50, wherein the collected electrical power can be used to supplement the energy use of the transport vehicle, such as the ship, train, or truck, or stored in the rechargeable battery 14 within the container.

Thus, the photovoltaic panels 12 and associated electrical interconnects 60, and optional rechargeable battery 14, can be operably connected to an over the road vehicle, such as but not limited to a semi-trailer, truck or van body.

In a further configuration, the photovoltaic panels 12 and associated electrical interconnects 60, and optional rechargeable battery 14 can be operably connected to a railroad car, such as but not limited to a box car. The electrical interconnects 60 are configured to operably engage the electrical interconnects of an adjacent intermodal shipping container 10 or even a coupled railroad car.

In one configuration, it is contemplated that rechargeable batteries 14 can be mounted within each intermodal shipping container 10, or a select subset of the intermodal shipping containers so that the batteries can become a power source that is used when needed. In a further configuration, a subset of the intermodal shipping containers 10 can be configured to house only rechargeable batteries 14, thus providing battery containers, wherein a plurality of surrounding or proximal intermodal shipping containers are electrically connected to the battery container. This reduces the necessary electrical interfaces, or connections, with the transport mechanism, as well as providing for movement of the battery container along the transportation chain. Thus, the battery container can be included in various steps along the transportation chain, wherein previously captured electrical power can be employed as subsequently necessary or in an improved efficiently manner.

The photovoltaic panels 12 are electrically connected to the electrical interconnect 60, wherein the electrical interconnect is configured to operably engage an electrical interconnect of an adjacent intermodal shipping container 10. The electrical interconnect 60 can be configured for manual interconnection or can include respective components of male/female interconnections that are operably engaged be operably engaging adjacent intermodal shipping containers.

The present system provides a further configuration to gather solar energy via the intermodal shipping containers 10, such as on cargo ships having multiple intermodal shipping containers, wherein a flexible cover is disposed over a plurality of the stacked intermodal shipping containers. The flexible cover can be operably deployed such as by pulling the flexible cover over the entire stack of intermodal shipping containers, while the transport ship is at the port. The same equipment that is used to lift containers into place (Gantry Cranes) could be used to lift up and attach the flexible solar energy collecting cover. It is contemplated the deployment of the flexible cover would be done after the cables are placed to secure the intermodal shipping containers. The flexible covers include plurality of commercially available flexible photovoltaic panels, such thin film panels, including but not limited to Renogy Flexible Monocrystalline Solar Panel, SunPower Flexible Solar Panel, Renogy 100-Watt Solar Flexible Kit, Renogy 350 Watt Solar Flexible Kit, and Topsolar Flexible Solar Panel.

The present system provides for the use of solar energy collection, such as photovoltaic panels 50, on intermodal shipping containers and truck boxes. The present system includes the electrical interconnects 60 configured to allow the electrical energy to be connected to an adjacent mechanically connected intermodal shipping container 10 or photovoltaic panel 50. The intermodal shipping containers 10 with the photovoltaic panels 12 can be stacked, mounted on a floor on a ship, mounted on a floor on a train car, or coupled to a truck trailer or flat surface with a mounting bracket.

The present system thus encompasses mounting the photovoltaic panel 12 or other solar panels on the intermodal shipping container 10 and truck boxes; mechanically connecting a plurality of intermodal shipping containers, wherein the intermodal shipping containers include an electrical interconnect to electrically connect adjacent containers. The methods include electrically interconnecting the intermodal shipping containers 10, as well as storing collected energy within the intermodal shipping containers with batteries 14 and, depending on the configuration, inverters. The methods include distributing the collected energy either before or after an inverter. It is further contemplated the intermodal shipping containers 10 having the photovoltaic panel 12 can be self-contained photovoltaic energy gathering containers that could be used as an energy source that could be delivered to a location and provide electricity for water purification, refrigeration or other needs.

In one configuration, the present electrical interconnect 60 includes a carriage 70, at least one electrical contact 90, a bias member 110, and at least one magnet 130.

The carriage 70 is sized to be disposed within the vertical dimension and the horizontal dimension of the recess.

The lower flange 32 of the bottom side rail 22 can include a cutout 25 or aperture sized to pass at least a portion of the carriage 70. Similarly, the upper flange 34 of the top side rail 24 can include a cutout 25 or aperture sized to pass at least a portion of the carriage 70.

In one configuration, the carriage 70 is generally U shaped, formed by a first leg 72 and a spaced second leg 74 projecting from a closed end 76 of the U. Each of the first leg 72 and the second leg 74 includes a tab 78 extending away from a longitudinal axis of the respective leg. Each tab 78 includes a control aperture 79. An outside surface of the closed end of the U can include a projecting stop 80, and in certain configurations, the outside end can include two stops. As set forth below, the stops 80 can be sized to define a minimum spacing between the carriages 70 of mechanically connected intermodal shipping containers 10. The stop 80 terminates at a free end 82, wherein the free end projects further than the first magnet 130.

Referring to FIGS. 7 and 8, a guide rod 84 extends from the lower flange 32 of the bottom side rail 22 to pass through the aperture 79 in a corresponding tab 78. In one configuration, the guide rod 84 includes a threaded section for engaging a nut 86. The aperture is oversized relative to the guide rod, thereby accommodating movement of the carriage in both the X and Y direction in the horizontal plane. In addition, the carriage 70 can pass through the cutout 25 in the side rail 22, 24 to move the carriage in the vertical direction between a retracted position and an extended position.

The bias member 110 in the configuration of a coil spring is disposed about the guide rod 84 to extend between the flange 32, 34 of the side rail 22, 24 and the tab 78. The bias member 110 urges the carriage 70 to the retracted position. The threaded engagement of the guide rod 84 and the nut 86 provides for selectively changing the compression of the bias member 110, and hence adjust the force exerted by the bias member in urging the carriage 70 to the retracted position.

The carriage 70 carries at least one, and as seen in FIGS. 7 and 8, at least two electrical contacts 90. The electrical contacts 90 are connected to the closed end 76 of the U shape carriage 70 and can be fixedly or adjustable connected to the carriage. Each electrical contact 90 has an interface 92, wherein the interface can include a contoured surface configured to engage a complimentary contoured surface of an opposing electrical contact. For example, the contoured surface of the interface 92 can include complementary projections and recesses, such as pegs and sockets.

The electrical contacts 90 are connected to an electric line 94 which in turn is connected to an electric device associated with the intermodal shipping container, such as the solar panels 50, converter, inverter, generators, or rechargeable battery 14.

Each carriage 70 further includes the magnet 130, and in select configurations a north pole magnet and a south pole magnet. As set forth above, in one configuration, the magnet 130 is sized such that the stop 80 projects to be coterminous with the magnet 130, thereby the magnet is protected from unintentional contact.

In one configuration, each magnet 130 is in the form of a ring magnet having a central aperture 133. The central aperture 133 of the ring magnet 130 is sized to receive one of the electrical contacts 90. The electrical contacts 90 and the ring magnets 130 are configured such that upon the magnets from opposing interconnect assemblies 60 on mechanically connected intermodal shipping containers 10 are proximate, the force of the bias members 110 is overcome and the magnets 130 of the electrical interconnects from the two intermodal shipping containers couple, thereby aligning the electrical contacts 90 (and particularly the contoured interface 92) between the two electrical interconnects 60. As each carriage 70 is mounted to the respective intermodal shipping container 10 with the floating connection, by virtue of the oversized apertures 79 in the tabs 78 as well as the periphery of the cutout 25 relative to the carriage, the respective carriages self-adjust relative to the corresponding intermodal shipping container 10 as the magnets 130 couple and the electrical contacts 90 engage. Thus, upon the stacking of two intermodal shipping containers 10, the contacts of the upwardly facing electrical interconnect 60 of the lower intermodal shipping container electrically connect with the downwardly facing electrical interconnect 60 of the upper intermodal shipping container.

As set forth herein, the lower flange 32 of the bottom side rail 22 includes the cutout 25 or aperture, and the closed end 76 of the carriage 70 passes through the cutout away from the side rail. Similarly, the top side rail 24 can include the cutout 25 in the upper flange 34 to accommodate a corresponding electrical interconnect 60 exposed toward the top or upper surface of the intermodal shipping container 10. The electrical interconnect 60 connected to the top side rail 24 is a mirror construction to the electrical interconnect set forth in connection with the bottom side rail 22. Thus, the upper flange 34 of the top side rail 24 includes the cutout 25, wherein the closed end 76 of the corresponding carriage 70 passes upward through the cutout.

The carriage 70 connected to the top side rail 24 includes a complementary magnet 130 to the magnet of the carriage of the bottom side rail 22. For example, if the carriage 70 of the bottom side rail 22 of an upper intermodal shipping container 10 includes a north pole and south pole ring magnet, the carriage of the top side rail 24 of a lower intermodal shipping container includes south pole and a north pole ring magnet, wherein the north pole magnet of the carriage of the bottom side rail aligns with the south pole magnet of the carriage of the top side rail of the lower intermodal shipping container. The aligned magnets produced a magnetic attraction between the two carriages 70, thereby drawing the carriages together and placing the electrical contacts 90 in operable connection.

The retracted position of the carriage 70 locates the electrical contacts 90 within the recess 33 between the respective flanges 32, 34. In addition, a lid or cover 18 can be attached to the intermodal shipping container 10 to encompass the electrical interconnect 60 and reduce impact from unintended contact and hence damage. The cover 18 can be sized to preclude exposure of the electrical interconnect 60 between the flanges 32, 34 of the side rail 22, 24.

In operation, as two intermodal shipping containers 10 are operably aligned and mechanically connected, the magnetic fields from the respective magnet 130 on the carriages 70 are generally aligned. That is, the magnets 130 are sufficiently aligned to draw the carriages 70 against the force from the bias members 110 from the retracted position to the extended position. As the opposing magnets 130 are fixed relative to the respective carriage 70 and the carriages can float along three axes relative to the shipping container 10, the magnets align the two carriages and thereby align the respective electrical contacts 90. The magnets 130 draw the carriages 70, against the imparted force from the bias member 110, towards each other to cause the complimentary contoured surfaces of the interface 92 of opposing contacts to seat, thereby electrically connecting the two intermodal shipping containers 10.

In one configuration, the projecting stop 80 on the outside surface of the carriages 70 can limit the amount of force between the electrical contacts 90, thereby transferring excess force to the carriage.

When the intermodal shipping containers 10 are decoupled, the mechanical connection at the corner castings 40 is released. The intermodal shipping containers 10 are then moved away from each other. As the intermodal shipping containers 10 move away from each other, the magnetic force between the magnets 130 of the opposing electrical interconnects 60 on the opposing carriages 70 is overcome and the electrical contacts 90 break their electrical connection.

The bias member 110 urging the carriages 70 to the respective retracted position, then locates the carriage of each intermodal shipping container 10 in the retracted position.

While the invention has been described in connection with several presently preferred embodiments thereof, those skilled in the art will appreciate that many modifications and changes may be made without departing from the true spirit and scope of the invention which accordingly is intended to be defined solely by the appended claims.

The invention claimed is:

1. An electrical interconnect for an intermodal shipping container, the electrical interconnect comprising:
   (a) a first carriage configured to be mounted to a side rail of the intermodal shipping container, the first carriage movable between an extended position and a retracted position;
   (b) a first electrical contact connected to the first carriage for movement with the first carriage;
   (c) a first magnet connected to the first carriage for movement with the first carriage; and
   (d) a first bias member configured to be located intermediate the first carriage and the side rail, the first bias member urging the first carriage to the retracted position.

2. The electrical interconnect of claim 1, wherein the carriage is U shaped having a closed end and a first leg and a second leg projecting from the closed end.

3. The electrical interconnect of claim 1, wherein the carriage is U shaped having a closed end and a first leg and a second leg projecting from the closed end and further comprising a stop projecting from an outside surface of the closed end.

4. The electrical interconnect of claim 1, further comprising a first guide rod configured to be connected the first carriage and the side rail, wherein the first bias member is a first coil spring disposed about the first guide rod.

5. The electrical interconnect of claim 1, wherein the first carriage is U-shaped having a closed end, a first leg projected from the closed end, and a second leg projecting from the closed end, wherein the first leg includes a first tab and the second leg includes a second tab.

6. The electrical interconnect of claim 1, wherein a portion of the first carriage is configured to pass through a cutout defined within the side rail.

7. The electrical interconnect of claim 1, wherein the first magnet is a ring magnet having a first central aperture, and wherein a portion of the first electrical contact passes through the central aperture.

8. The electrical interconnect of claim 1, wherein the first carriage includes a second electrical contact and a second magnet.

9. The electrical interconnect of claim 1, wherein the first carriage includes a second electrical contact and a second magnet, wherein the second magnet is a ring magnet having a second central aperture and a portion of the second magnet is sized to pass through the second central aperture.

10. The electrical interconnect of claim 1, further comprising a second carriage configured to be mounted to a second side rail of the intermodal shipping container, the second carriage movable between an extended position and a retracted position, the second carriage comprising a third electrical contact and a third magnet.

11. The electrical interconnect of claim 1, wherein the first carriage is U-shaped having a closed end, a first leg projected from the closed end, and a second leg projecting from the closed end, wherein the first leg includes a first tab and the second leg includes a second tab, and further comprising a first guide rod configured to extend from the first tab to the side rail.

12. An intermodal shipping container comprising:

(a) a first bottom side rail and a second bottom side rail, the first bottom side rail and the second bottom side rail extending parallel to a longitudinal axis of the intermodal shipping container;

(b) a first top side rail and a second top side rail, the first top side rail and the second top side rail extending parallel to the longitudinal axis of the intermodal shipping container;

(c) a first carriage moveably mounted to one of the first bottom side rail or the second bottom side rail, the first carriage including a first electrical contact, a second electrical contact, and a first magnet;

(d) a first bias member intermediate the first carriage and its respective first bottom side rail or second bottom side rail;

(e) a second carriage moveably mounted to one of the first top side rail or the second top side rail, the second carriage including a third electrical contact, a fourth electrical contact, and a second magnet; and (f) a second bias member intermediate the second carriage and its respective first top side rail or second top side rail.

13. The intermodal shipping container of claim 12, wherein the first carriage is U shaped and the second carriage is U shaped.

14. The intermodal shipping container of claim 12, wherein a plurality of photovoltaic panels are mounted on the intermodal shipping container and wherein the plurality of photovoltaic panels are electrically interconnected.

* * * * *